(12) United States Patent
Ono et al.

(10) Patent No.: US 10,706,978 B2
(45) Date of Patent: Jul. 7, 2020

(54) CORE OF BOILING WATER REACTOR

(71) Applicant: Hitachi-GE Nuclear Energy, Ltd., Hitachi-shi, Ibaraki (JP)

(72) Inventors: Michitaka Ono, Tokyo (JP); Motoo Aoyama, Tokyo (JP); Takeshi Mitsuyasu, Tokyo (JP)

(73) Assignee: Hitachi-GE Nuclear Energy, Ltd., Hitachi-shi (JP)

( * ) Notice: Subject to any disclaimer, the term of this patent is extended or adjusted under 35 U.S.C. 154(b) by 317 days.

(21) Appl. No.: 15/786,877

(22) Filed: Oct. 18, 2017

(65) Prior Publication Data

US 2018/0122522 A1    May 3, 2018

(30) Foreign Application Priority Data

Nov. 1, 2016  (JP) .................. 2016-214101

(51) Int. Cl.
| | | |
|---|---|---|
| *G21C 19/20* | (2006.01) | |
| *G21C 5/18* | (2006.01) | |
| *G21C 3/30* | (2006.01) | |

(52) U.S. Cl.
CPC ............ *G21C 19/205* (2013.01); *G21C 3/30* (2013.01); *G21C 5/18* (2013.01); *Y02E 30/40* (2013.01)

(58) Field of Classification Search
CPC .......... G21C 19/205; G21C 3/30; G21C 5/18
USPC ........................................ 376/267
See application file for complete search history.

(56) References Cited

U.S. PATENT DOCUMENTS 5,307,387 A * 4/1994 Nakajima ............ G21C 19/205
                                                                 376/267

FOREIGN PATENT DOCUMENTS

JP            62-30993 A      2/1987

* cited by examiner

*Primary Examiner* — Jack W Keith
*Assistant Examiner* — Daniel Wasil
(74) *Attorney, Agent, or Firm* — Crowell & Moring LLP

(57) ABSTRACT

There is provided a core of a boiling water reactor that can be operated without loading a new fuel assembly at an operation cycle before decommissioning. The core of the boiling water reactor includes multiple fuel assemblies loaded in a square lattice shape. The multiple fuel assemblies are arranged in the core based on the number of residence cycles of fuel assemblies laterally adjacent and longitudinally adjacent to a fuel assembly having the shortest loading period in core cross section. The arrangement of fuel assemblies is also based on the number of residence cycles of fuel assemblies diagonally adjacent to the fuel assembly having the shortest loading period.

6 Claims, 11 Drawing Sheets

[Fig. 1]
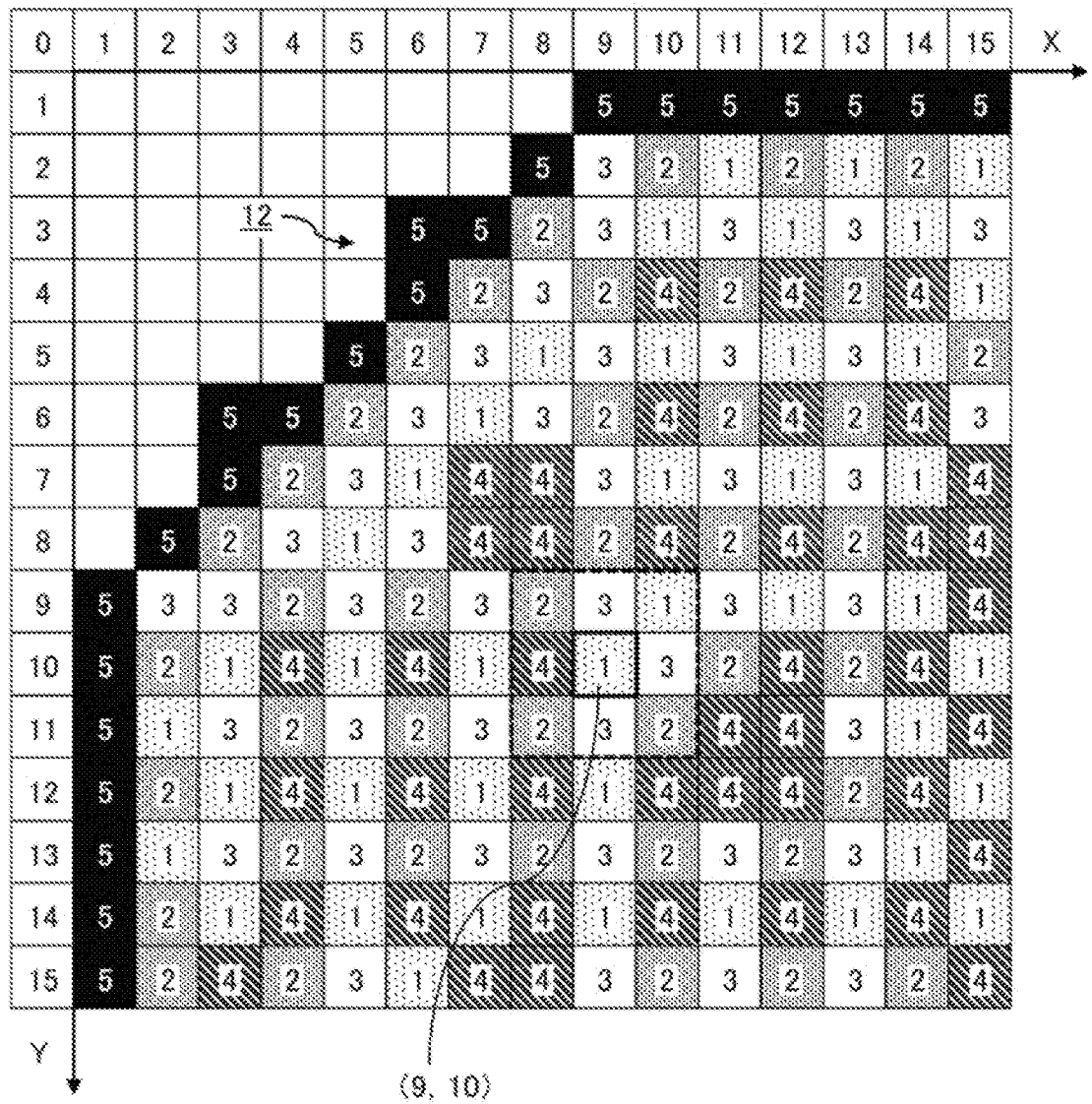
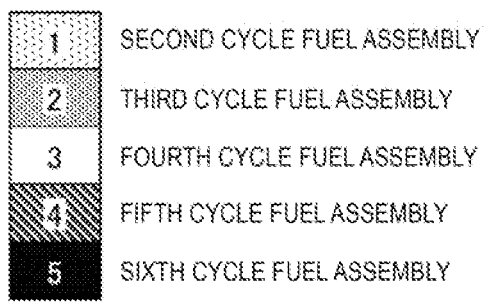

[Fig. 2]
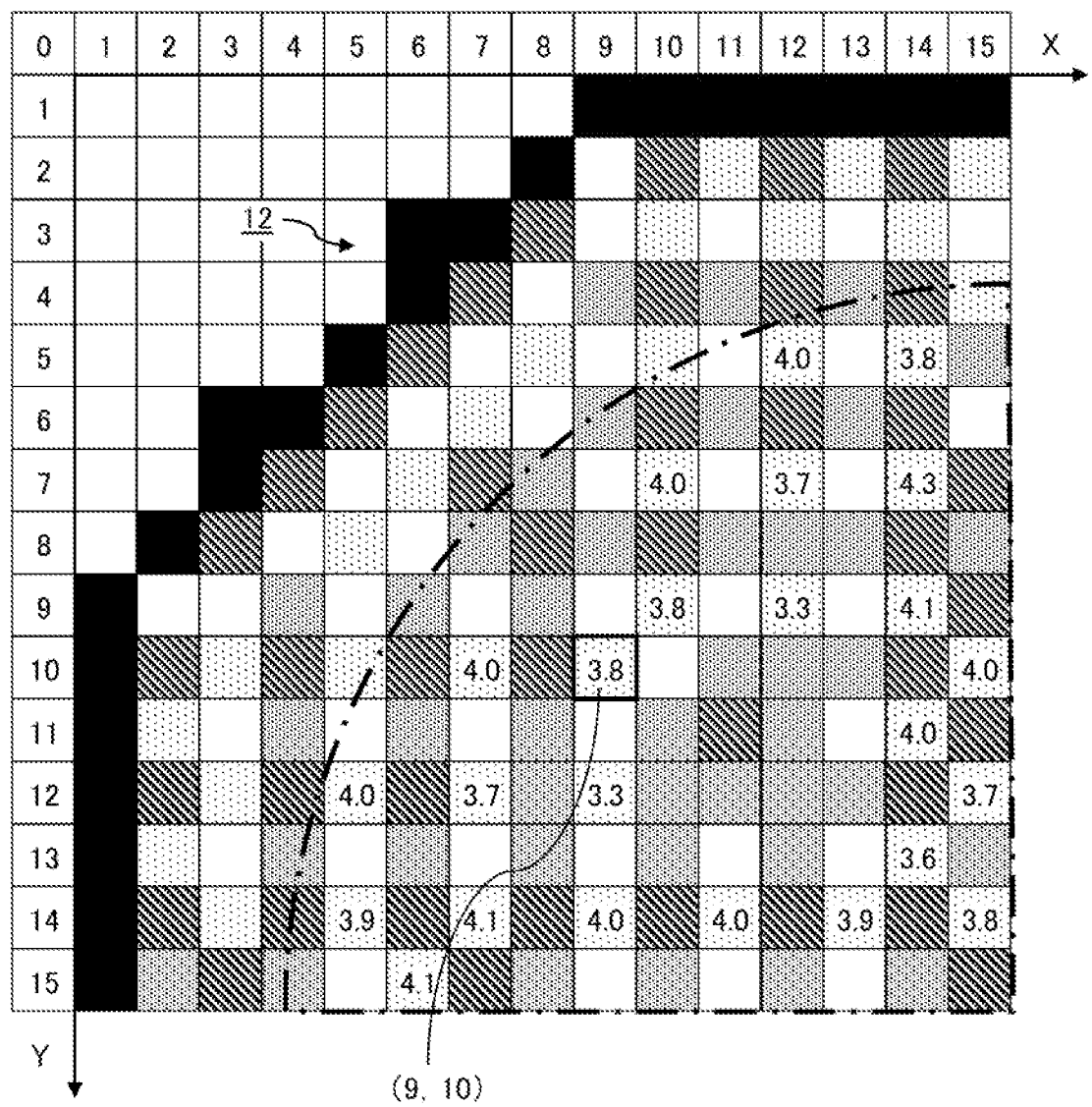

[Fig. 3]
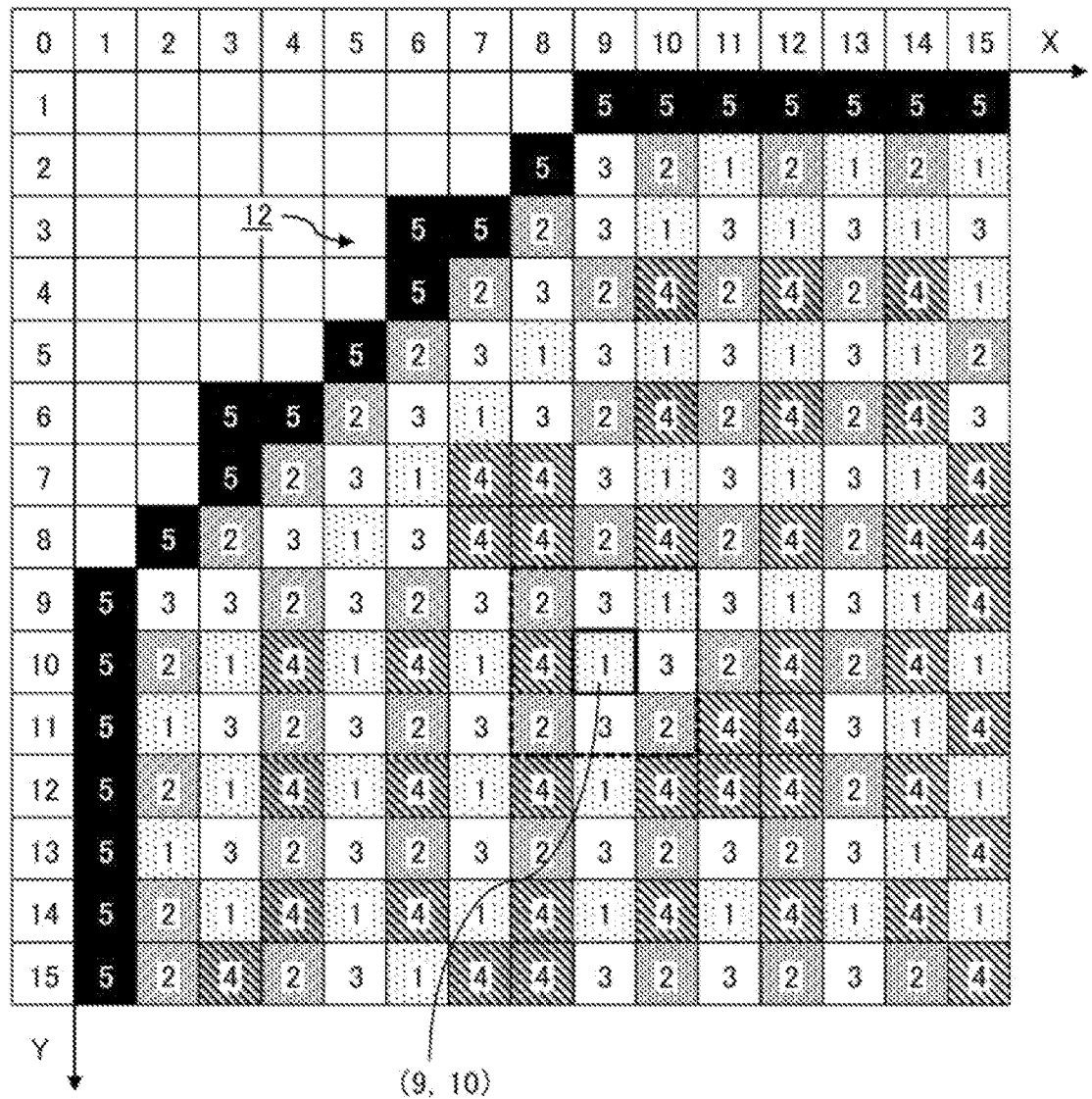

[Fig. 4]
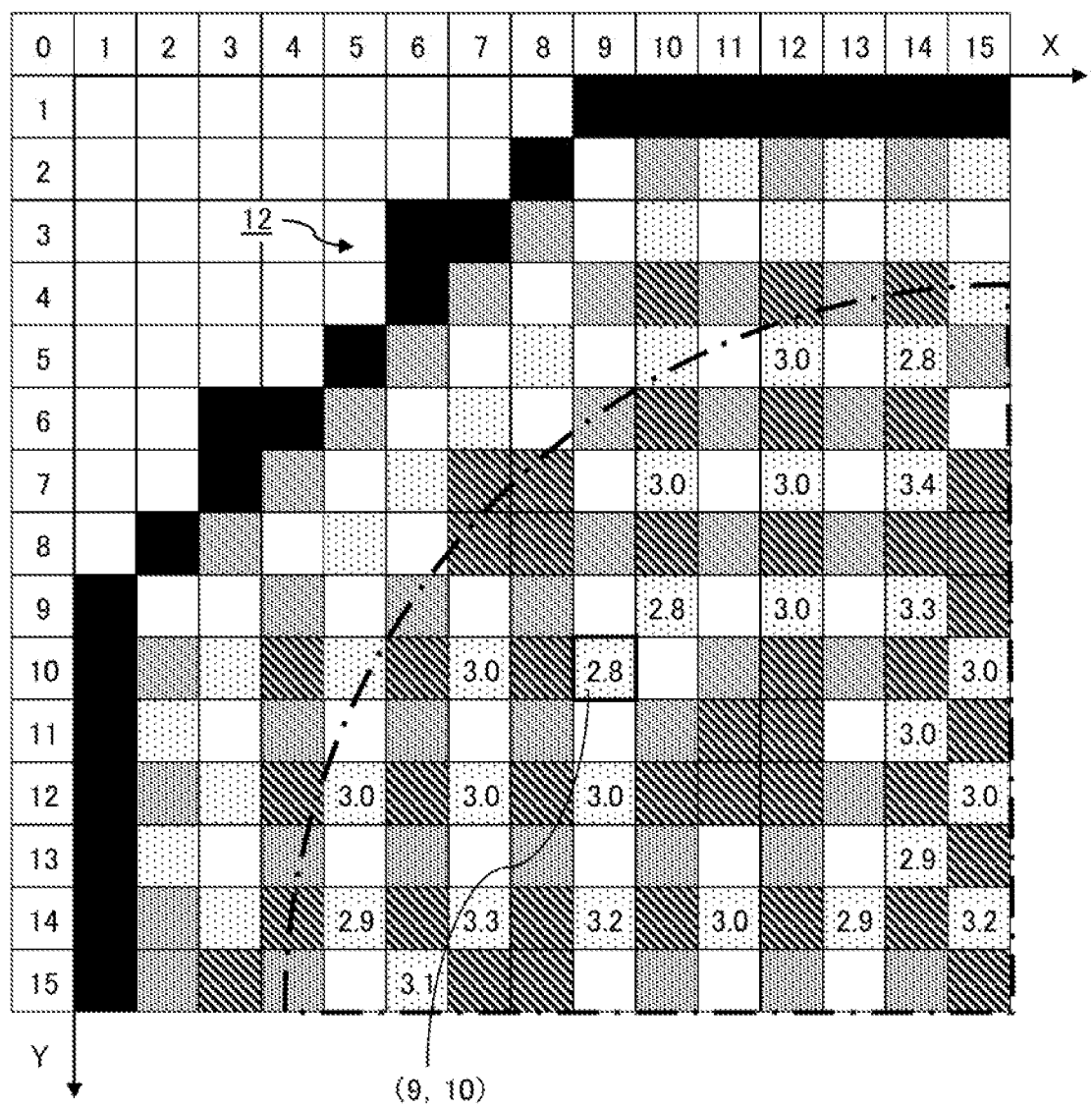

[Fig. 5]
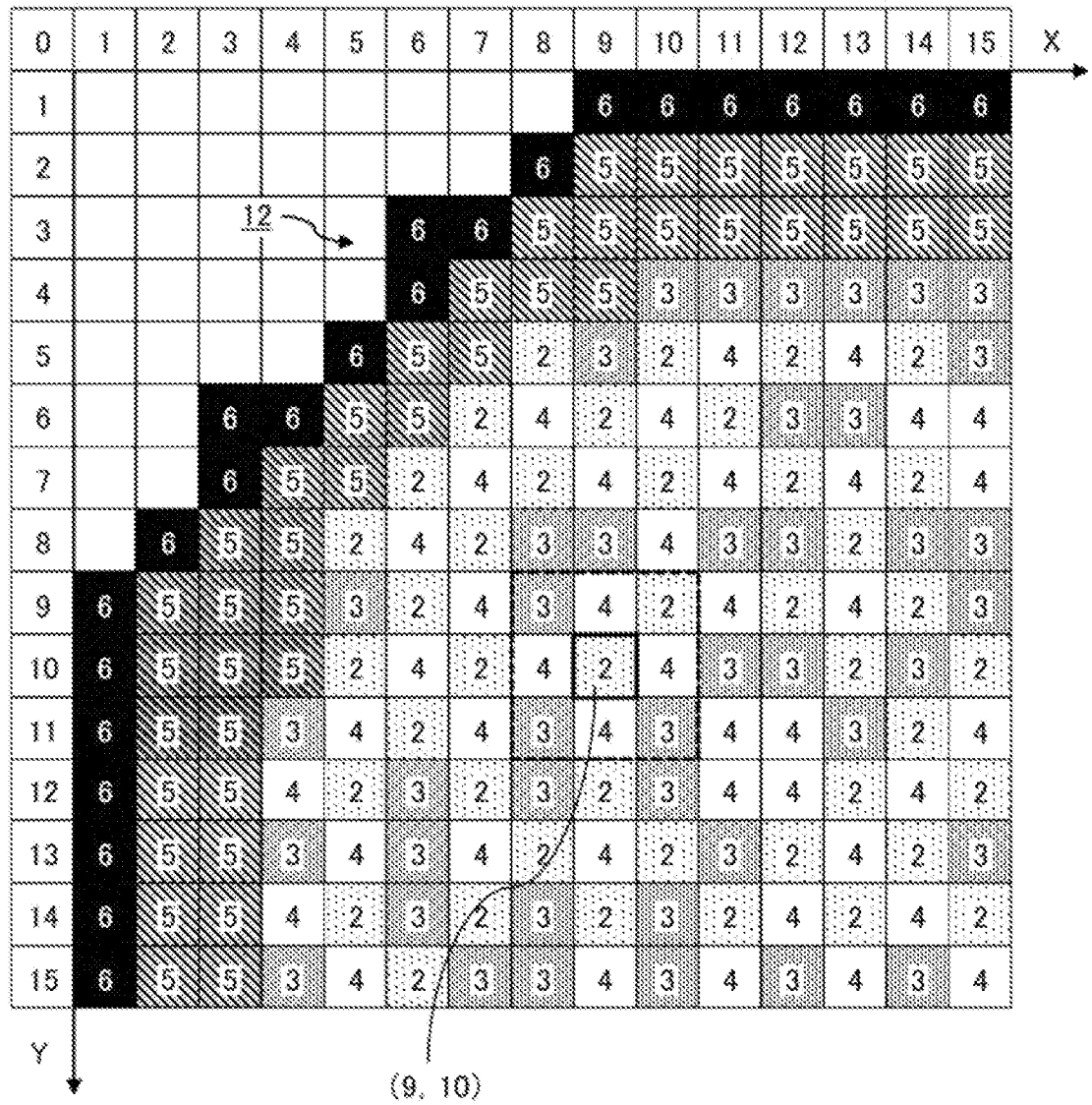
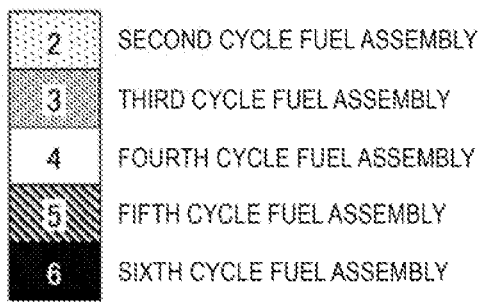

[Fig. 6]
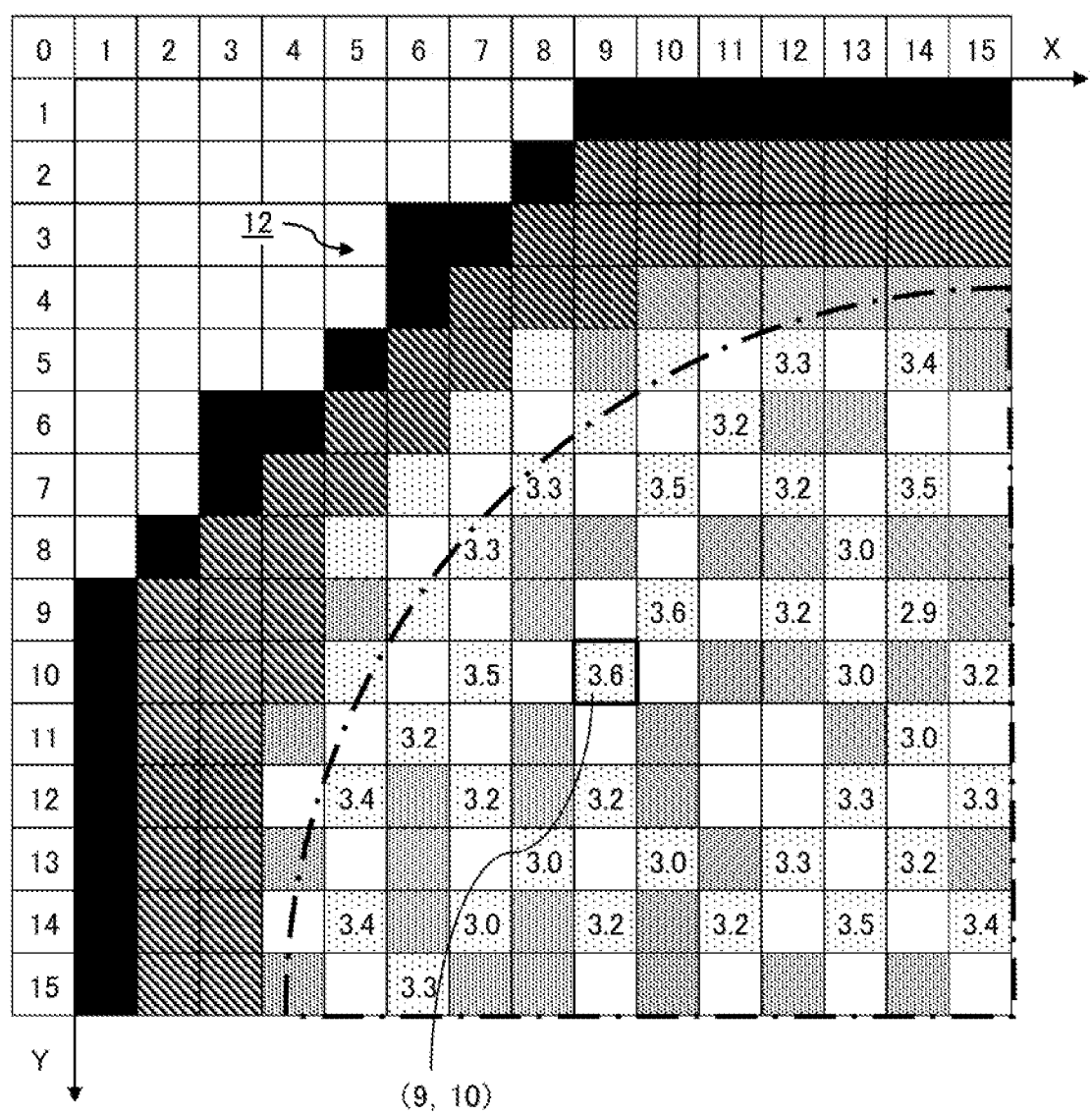

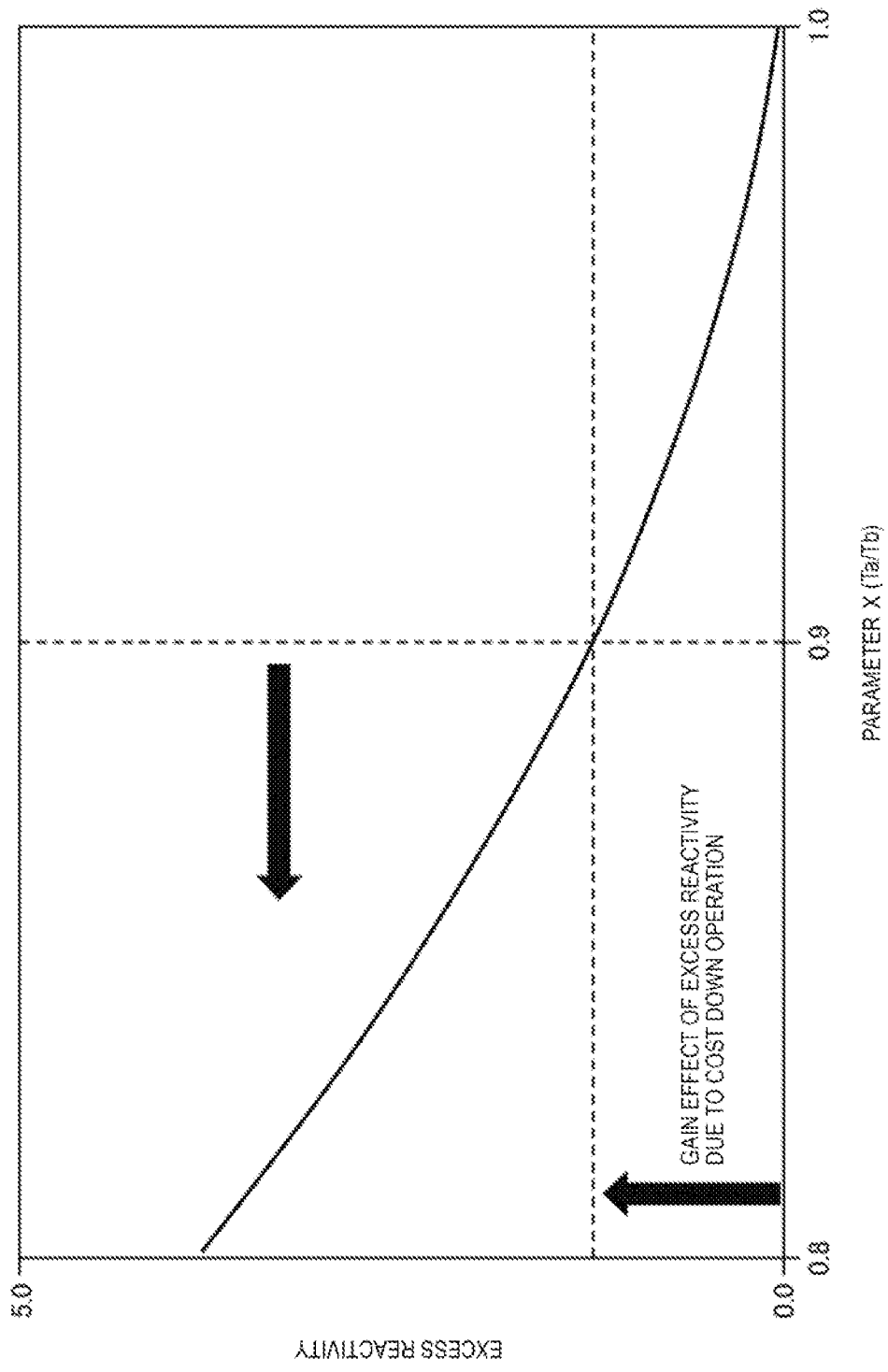

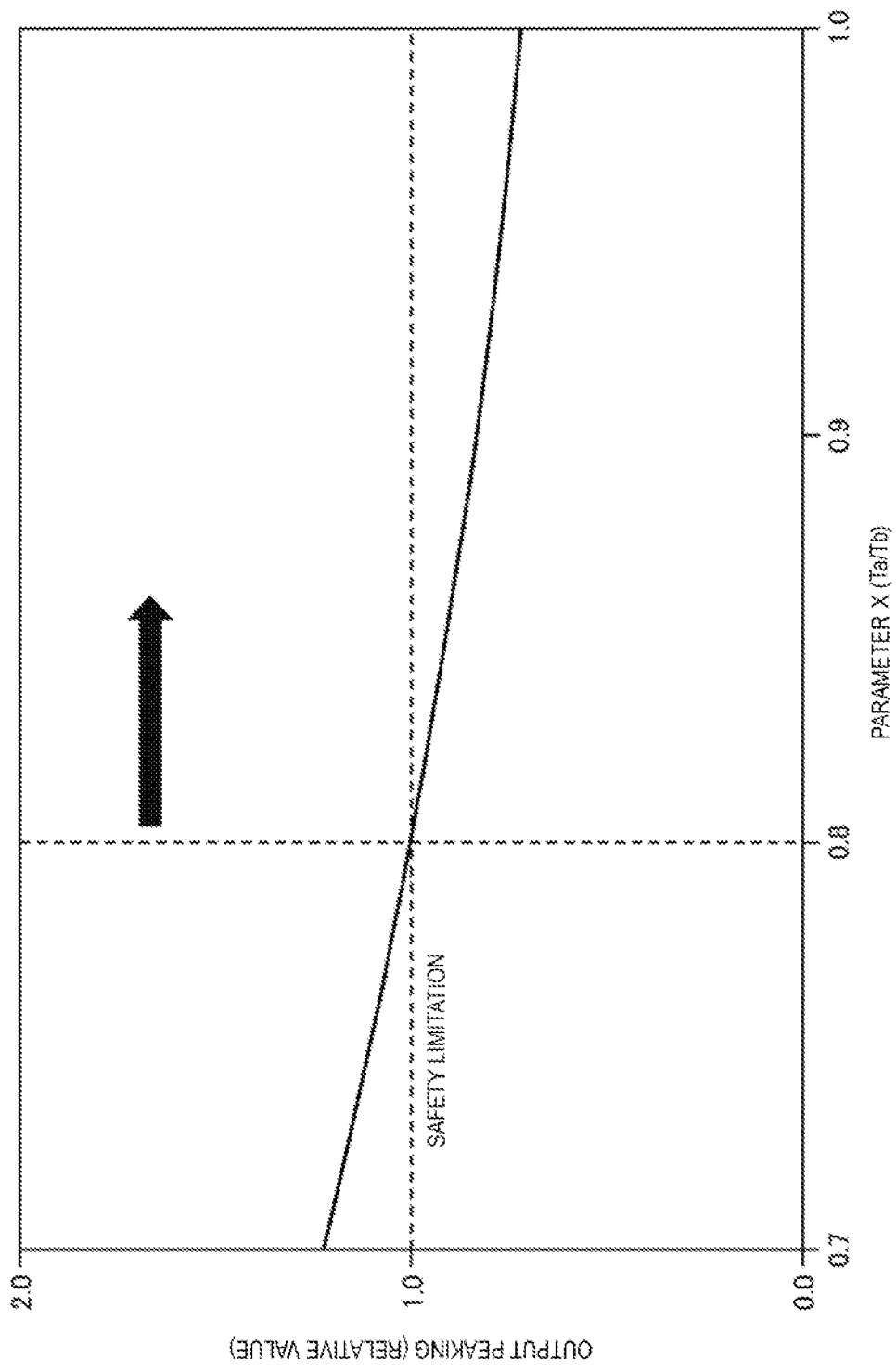
[Fig. 8]

[Fig. 9]
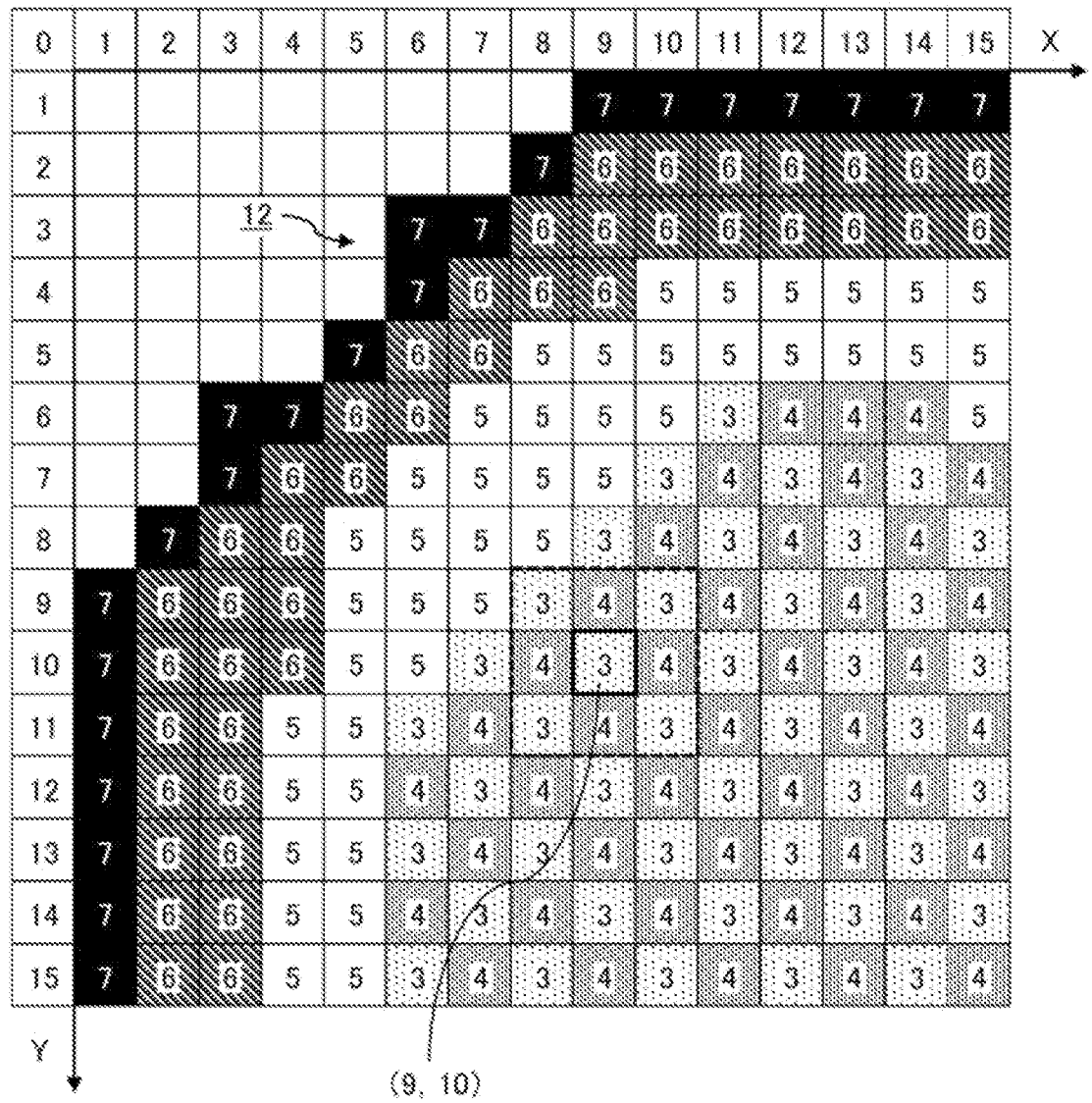

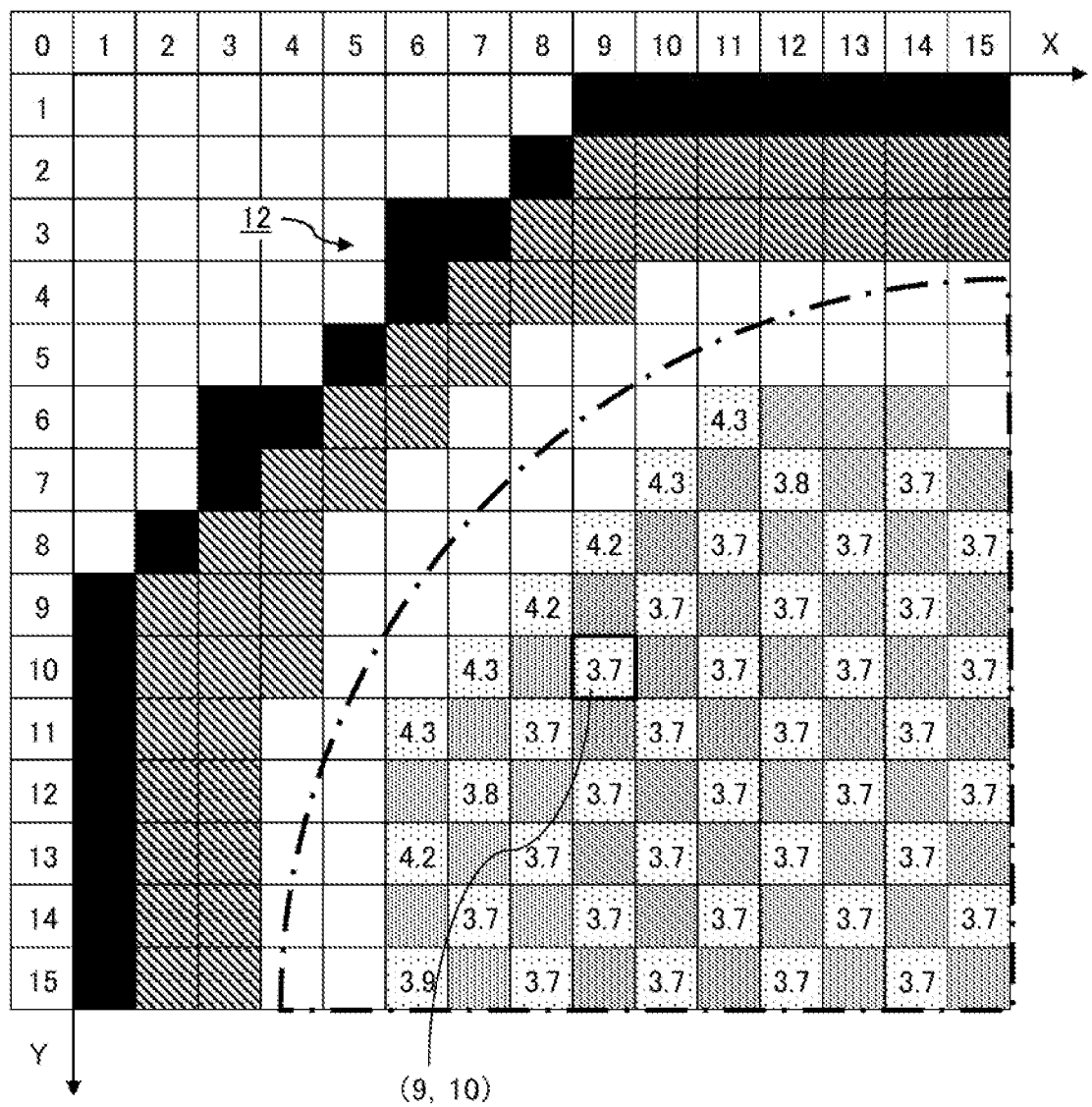
[Fig. 10]

[Fig. 11]
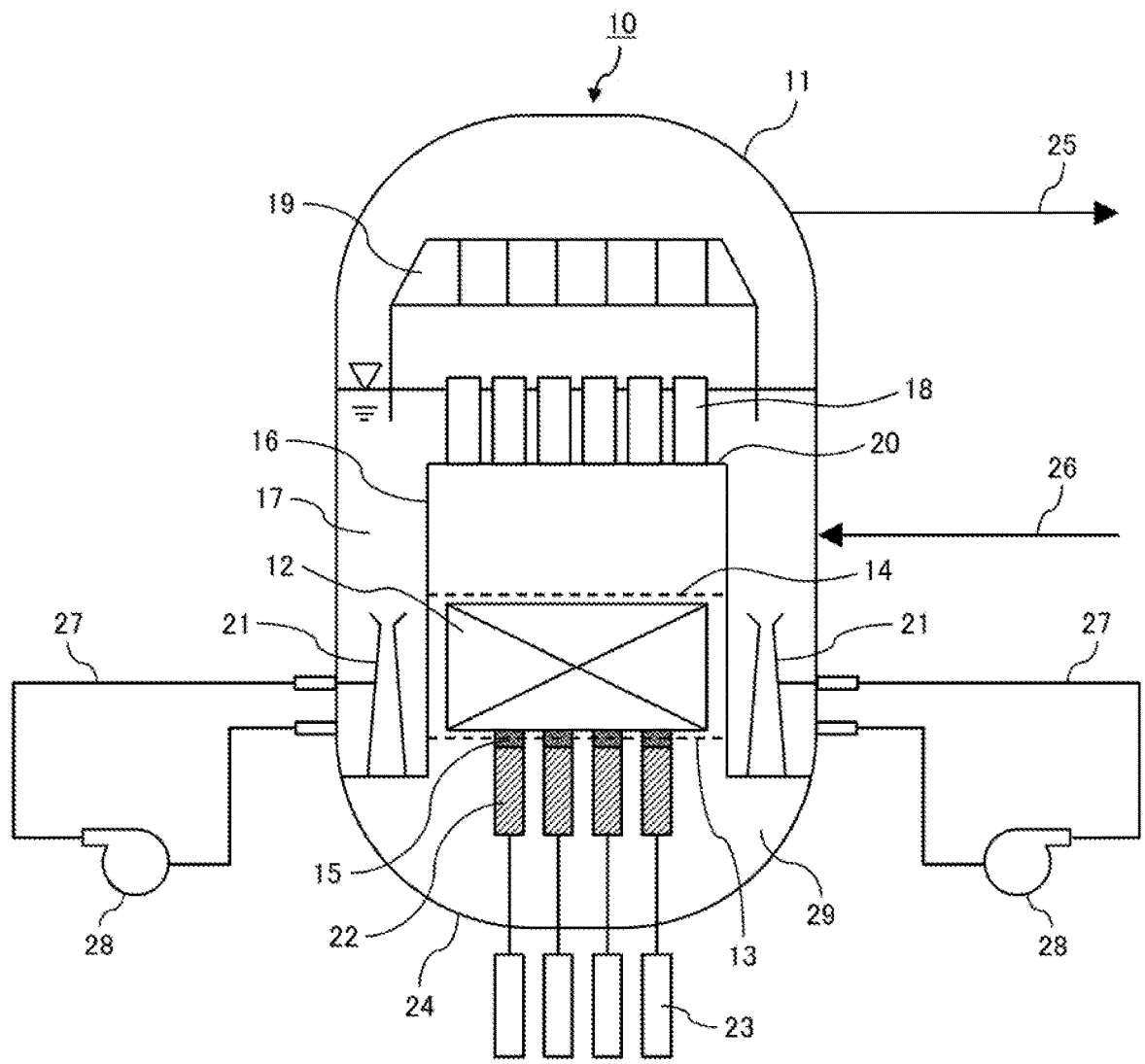

CORE OF BOILING WATER REACTOR

TECHNICAL FIELD

The present invention relates to a core of a boiling water reactor, and particularly to a core of a boiling water reactor before decommissioning.

BACKGROUND ART

In a boiling water reactor, a plurality of fuel assemblies are arranged and loaded in a square lattice shape in a core provided in a reactor pressure vessel. The fuel assemblies loaded into the core reside in the core for a predetermined period, are taken out of the reactor after reaching a predetermined burnup degree, and are exchanged for new fuel assemblies.

In the core of the related art, it is common to operate the core by a fuel assembly having the maximum number of residence cycles in the core being loaded into the outermost periphery of the core and fuel assemblies having different numbers of residence cycles in the core by including a new fuel assembly and the fuel assembly with the maximum number of residence cycles in the core are dispersedly loaded into an inside of the outermost periphery of the core.

In a method for operating the boiling water reactor of the core of the related art, in a case where the boiling water reactor is decommissioned, a fuel assembly newly loaded during fuel exchange before the decommissioning has a problem that fuel cost to power generation amount is increased by a large amount of unreacted fissile uranium of which the number of residence cycles in the core is shorter than that during normal operation being remained.

For example, in PTL 1, fuel cost of a four-batch core is calculated and PTL 1 describes that the fuel cost is significantly deteriorated in three cycles before the decommissioning and, in particular, the fuel cost is twice or more in a cycle immediately before the decommissioning. Therefore, PTL 1 discloses a method for alleviating deterioration in fuel cost by loading a fuel assembly having a smaller inventory of uranium heavy metal than that of a normally used fuel assembly during the final fuel exchange immediately before the decommissioning. Specifically, in order to alleviate the deterioration in the fuel cost in the boiling water reactor before the decommissioning, a configuration in which a fuel assembly having increased the number of water rods to be disposed is loaded into the core during the final fuel exchange prior to the decommissioning is disclosed. In addition, instead of increase in the number of water rods to be disposed, a configuration in which fuel assemblies in which fuel rods not filled with fuel pellets are disposed or fuel assemblies in which fuel rods are reduced in diameter are loaded is described.

CITATION LIST

Patent Literature

PTL 1: JP-A-62-30993

SUMMARY OF INVENTION

Technical Problem

Nuclear power plants are decommissioned when life thereof is finished due to the aging of equipment or the like. At this time, in the final operation cycle before decommissioning, in a case where new fuel assemblies are added and operated like the operation cycle of the related art, there is a concern about the burden of fuel cost, increase in radioactive waste, and increase in critical management risk of fuel which is taken out. However, in the configuration described in PTL 1, although since PTL 1 is configured to load new fuel assemblies with a smaller inventory of uranium heavy metal than normally used fuel assemblies, it is possible to alleviate the deterioration of the fuel cost, since the PTL 1 has a configuration in which new fuel assemblies are newly loaded into the core, it is not enough to solve the concern about burden of fuel cost, increase in radioactive waste, and increase in critical management risk due to increase in the number of fuel which is taken out.

Therefore, the invention provides a core of a boiling water reactor that can be operated without loading a new fuel assembly in an operation cycle before the decommissioning.

Solution to Problem

In order to solve the problem described above, according to the invention, there is provided a core of a boiling water reactor in which multiple fuel assemblies are loaded in a square lattice shape, in which, during fuel exchange, without loading fuel assemblies having a shorter loading period than a fuel assembly having the shortest loading period loaded into the core before the fuel exchange in the core after the fuel exchange, the multiple fuel assemblies are loaded so that a parameter X represented by the following equation (1) is 0.8 or more and 1.0 or less using the number of residence cycles, in the core, of fuel assemblies laterally adjacent and longitudinally adjacent to a fuel assembly having the shortest loading period and the number of residence cycles, in the core, of fuel assemblies diagonally adjacent thereto, among fuel assemblies to be loaded into the core after the fuel exchange.

$$X = Ta/Tb \qquad (1)$$

where,

Ta: T in a case where fuel exchange is performed,

Tb: T in a case where fuel exchange is not performed,

T: an average value of t of fuel assembly having shortest loading period loaded into an inside-core region, t: $(\Sigma Ts + 0.5 \times \Sigma Tx)/(4 + 0.5 \times 4)$, Ts: the number of residence cycles in reactor of fuel assemblies laterally and longitudinally adjacent to fuel assembly having shortest loading period in core cross section, and Tx: the number of residence cycles in reactor of fuel assemblies diagonally adjacent to fuel assembly having shortest loading period in core cross section.

Advantageous Effects of Invention

According to the invention, it is possible to provide a core of a boiling water reactor that can be operated without loading a new fuel assembly in an operation cycle before the decommissioning.

The problems, configurations, and effects other than those described above will be clarified from description of the embodiments below.

BRIEF DESCRIPTION OF DRAWINGS

FIG. 1 is a view illustrating a cross section of a core of a boiling water reactor of Example 1 according to an example of the invention, which is a fuel disposition view of a ¼ core.

FIG. 2 is a view illustrating t of an inside-core region in the fuel disposition illustrated in FIG. 1.

FIG. 3 is a cross-sectional view of an equilibrium core of a boiling water reactor in an operation cycle in which a new fuel assembly is loaded, which is a fuel disposition view of the ¼ core.

FIG. 4 is a view illustrating an inside-core region t in the fuel disposition illustrated in FIG. 3.

FIG. 5 is a cross-sectional view illustrating a core of a boiling water reactor of Example 2 according to another example of the invention, which is a fuel disposition view of a ¼ core.

FIG. 6 is a view illustrating t of an inside-core region in the fuel disposition illustrated in FIG. 5.

FIG. 7 is a diagram illustrating a relationship between a parameter X (Ta/Tb) expressed as a core residence period of fuel assemblies adjacent to a fuel assembly having the shortest loading period and excess reactivity.

FIG. 8 is a diagram illustrating a relationship between the parameter X (Ta/Tb) expressed as a core residence period of the fuel assemblies adjacent to the fuel assembly having the shortest loading period and power peaking.

FIG. 9 is a view illustrating a cross section of a core of a boiling water reactor of Example 3 according to another example of the invention, which is a fuel disposition view of a ¼ core.

FIG. 10 is a view illustrating t of an inside-core region in the fuel disposition illustrated in FIG. 9.

FIG. 11 is an overall schematic configuration view of a boiling water reactor according to an embodiment of the invention.

DESCRIPTION OF EMBODIMENTS

In the present specification, a boiling water reactor includes a normal boiling water reactor (BWR) that includes a recirculation pump, and uses cooling water as a moderator to flow the cooling water through outside a reactor pressure vessel and again to flow into a down comer in the core pressure vessel and an advanced boiling water reactor (ABWR) that includes an internal pump instead of the recirculation pump and circulates the coolant in the core pressure vessel. As the coolant, for example, water, pure water, heavy water, boric acid water or the like is used. In the following description, the coolant is referred to as cooling water and a case where a core according to the invention is applied to a boiling water reactor (BWR) will be described as an example.

FIG. 11 is an overall schematic configuration view of a boiling water reactor (BWR) according to an embodiment of the invention. As illustrated in FIG. 11, in a boiling water reactor 10 to which a fuel disposition of fuel assemblies to be loaded into a core according to the invention to be described below is applied, a cylindrical core shroud 16 is installed in a reactor pressure vessel 11 and a core 12 in which multiple fuel assemblies are loaded is installed in the core shroud 16. In addition, a shroud head 20 that covers the core 12, a gas-water separator 18 that is attached to the shroud head 20 and also extends upward, and steam dryer 19 that is disposed above the gas-water separator 18 are provided in the core pressure vessel 11.

An upper lattice plate 14 is disposed in the core shroud 16 below the shroud head 20 and is attached to the core shroud 16 and positioned at an upper end portion of the core 12. A core plate 13 is positioned at a lower end portion of the core 12, is disposed in the core shroud 16, and is installed in the core shroud 16. In addition, a plurality of fuel supports 15 are installed on the core plate 13.

In addition, in the core pressure vessel 11, in order to control nuclear reaction of the fuel assemblies, a control rod guide tube 22 which enables insertion of a plurality of cross-sectional cross-shape type control rods (not illustrated) into the core 12 is provided. A control rod drive 23 is provided in a control rod drive housing (not illustrated) installed below a lower mirror 24 which is a bottom portion of the reactor pressure vessel 11 and a control rod (not illustrated) is connected to the control rod drive 23.

An annular down comer 17 is formed between the cylindrical core shroud 16 and an inside surface of the reactor pressure vessel 11. A jet pump 21 is installed in the down comer 17. A recirculation system provided in the core pressure vessel 11 has a recirculation system tube 27 and a recirculation pump 28 connected to the recirculation system tube 27. Cooling water discharged from the jet pump 21 is supplied to the core 12 via a lower plenum 29. The cooling water becomes gas-liquid two-phase flow including water and steam by being heated when the cooling water passes through the core 12. The gas-water separator 18 separates the gas-liquid two-phase flow into steam and water. The separated steam in which moisture is further removed in a steam dryer 19 is guided to a main steam tube 25. This steam is led to a steam turbine (not illustrated) to rotate the steam turbine. A generator (not illustrated) connected to the steam turbine rotates to generate electric power. The steam discharged from the steam turbine is condensed in a condenser (not illustrated) to become water. This condensed water is supplied as supply water into the reactor pressure vessel 11 by a water supply tube 26. The water separated by the gas-water separator 18 and the steam dryer 19 falls and reaches an inside of the down comer 17 as cooling water. As described above, a recirculation system including the jet pump 21, the recirculation system tube 27, and the recirculation pump 28 connected to the recirculation system tube 27 forcedly circulates the cooling water into the core 12 in order to efficiently remove the heat generated in the core 12.

In a method for operating the boiling water reactor (BWR) of the related art, the number of new fuel assemblies and the fuel disposition (fuel assembly loading position to core) are determined so that excess reactivity of the core becomes zero at the end of a cycle. In addition, since the amount of the burnable poison such as gadolinia (Gd) mixed in new fuel assemblies is determined so as to burn out in an operation cycle, an infinite multiplication factor of a fuel assembly loaded into the core at the end of the cycle is monotonously decreased as the exposure increases. In other words, the infinite multiplication factor of the fuel assembly is proportional to the number of residence cycles in the core. In order to obtain the adequate excess reactivity without loading new fuel assemblies, it is preferable that the fuel assemblies having a short number of residence cycles in the core, among the fuel assemblies to be loaded into the core are collected in an inside-core region which is 70% of a radius of a circumscribed circle of the core (radius of circumscribed circle circumscribing peripheral fuel assembly to be loaded into outermost circumference of core) which is about half the area of the cross-sectional area in the core with high neutron importance.

As a result of further investigation, the inventors found a condition of fuel loading of the core determined by a parameter X expressed by the following equation (1).

$$X = Ta/Tb \quad (1)$$

where,

Ta: T in a case where fuel exchange is performed,

Tb: T in a case where fuel exchange is not performed,

T: an average value of t of fuel assembly having shortest loading period loaded into the inside-core region, t: $(\Sigma Ts + 0.5 \times \Sigma Tx)/(4 + 0.5 \times 4)$, Ts: the number of residence cycles of fuel assemblies laterally adjacent and longitudinally adjacent to fuel assembly having shortest loading period in core cross section, and Tx: the number of residence cycles of fuel assemblies obliquely adjacent to fuel assembly having shortest loading period in horizontal cross section in the core.

T is a value obtained by taking weighted average of the number of residence cycles, in the core, of fuel assemblies laterally adjacent, longitudinal adjacent, and diagonally adjacent to a fuel assembly with the shortest loading period, which has maximum reactivity, in the horizontal cross section of the core and is an index indicating a degree of whether or not fuel assemblies having a short loading period are loaded intensively into the core, in a certain fuel disposition. Here, the term "laterally adjacent and longitudinal adjacent in the cross section of the core" means, that is, that it is adjacent to four side surfaces of a channel box having a cross-section square shape constituting the fuel assembly.

When fuel assemblies having a short loading period are intensively loaded, the gain of the excess reactivity is increased and the power peaking becomes severe. The parameter X is a ratio of T (Ta) in the case of performing fuel exchange, and T (Tb) in the case of not performing fuel exchange and is an index indicating a degree of how much the fuel assemblies having a short loading period are loaded into the core inside region by the fuel exchange.

FIG. 7 is a diagram illustrating a relationship between a parameter X (Ta/Tb) expressed as a core residence period of fuel assemblies adjacent to a fuel assembly having the shortest loading period and excess reactivity, and FIG. 8 is a diagram illustrating a relationship between the parameter X (Ta/Tb) expressed as the core residence period of the fuel assemblies adjacent to a fuel assembly having the shortest loading period and power peaking. As illustrated in FIG. 7, if parameter X (Ta/Tb) is 1.0 or less, gain of the excess reactivity can be obtained. When parameter X (Ta/Tb) is decreased as much as possible, although the gain of the excess reactivity can be obtained, power peaking becomes severe. As illustrated in FIG. 8, when the parameter X (Ta/Tb) is less than 0.8, the power peaking exceeds safety limitation and it becomes impossible to operate safely. As illustrated above, it is understood that it is preferable to set the parameter X (Ta/Tb) to 0.8 or more and 1.0 or less. Further, as illustrated in FIG. 7, since a gain effect having excess reactivity which is larger than the power coastdown operations which obtain excess reactivity can be obtained by decrease in the core power of the boiling water reactor (BWR), it is preferable that the parameter X (Ta/Tb) becomes 0.9 or less.

Hereinafter, examples of the invention reflecting study results described above will be described with reference to the drawings.

Example 1

FIG. 1 is a view illustrating a cross section of a core 12 of a boiling water reactor of Example 1 according to an example of the invention, which is a fuel disposition view of a ¼ core, FIG. 2 is a view illustrating t of an inside-core region in the fuel disposition illustrated in FIG. 1. In addition, FIG. 3 is a cross-sectional view of an equilibrium core of a boiling water reactor in an operation cycle in which a new fuel assembly is loaded, which is a fuel disposition view of the ¼ core, and FIG. 4 is a view illustrating an inside-core region t in the fuel disposition illustrated in FIG. 3. For convenience of explanation, coordinate axes (X axis and Y axis) are attached to the ¼ core illustrated in FIG. 1 to FIG. 4.

First, a relationship between FIG. 1 and FIG. 3 will be described. In a fuel disposition of the core 12 (¼ core) which is an equilibrium core of FIG. 3 in which a new fuel assembly (first cycle fuel assembly) is loaded into the core 12, a fuel disposition of the core 12 after the fuel exchange becomes a fuel disposition illustrated in FIG. 1 without taking out the fuel assembly from the core 12 and without loading a new fuel assembly, that is, only by changing dispositions of multiple fuel assemblies loaded into the core 12 after one cycle operation (after one cycle burnup). Therefore, in the fuel assembly loaded into the ¼ core illustrated in FIG. 2, only by changing the dispositions of multiple fuel assemblies loaded into the core 12, a value of t for each fuel assembly loaded into the inside-core region after the fuel exchange is illustrated. Here, the inside-core region is a region surrounded by a one-dot chain line in FIG. 2 and is a region of an inside of a circle of 70% of the core circumscribed circle radius (radius of circumscribed circle circumscribing fuel assembly to be loaded into outermost periphery of core 12). In addition, an outside of a circle of 70% of the core circumscribed circle radius is set to an outside-core region.

In addition, in FIG. 1 and FIG. 3, the numbers assigned to the respective fuel assemblies to be loaded into the core 12 represent the numbers of residence cycles of the fuel assembly in the core. For example, in FIG. 3, "1" indicating a new fuel assembly (first cycle fuel assembly) newly loaded into the core 12 is assigned to a fuel assembly loaded at a position of coordinates (9, 10). In addition, similarly, "2" indicating a fuel assembly (second cycle fuel assembly) after one cycle burnup (after one cycle operation) is assigned to a fuel assembly loaded at a position of coordinates (8, 9) and "3" indicating a fuel assembly (third cycle fuel assembly) after three cycle burnup (after three cycle operation) is assigned to a fuel assembly loaded at a position of coordinates (9, 8). Similarly, "4" indicating a fourth cycle fuel assembly is assigned to a fuel assembly after four cycle burnup (after four cycle operation) and "5" indicating a fifth fuel assembly is assigned to a fuel assembly after five cycle burnup (after five cycle operation).

As described above, in FIG. 1, in the fuel disposition of the core 12 (¼ core) which is the equilibrium core illustrated in FIG. 3, "2" to "6" indicating the second cycle fuel assembly to the sixth cycle fuel assembly are assigned to each fuel assembly since it is the fuel disposition of the core 12 after the fuel exchange is performed by only dispositions of multiple fuel assemblies loaded into the core 12 being changed, without taking out the fuel assembly from the core 12 and without loading a new fuel assembly from the outside of the core after one cycle operation (after one cycle burnup).

The core 12 of the boiling water reactor illustrated in FIG. 3 is changed only the disposition position of the fuel assembly loaded into the core 12 in order to obtain the fuel disposition of the core 12 of the boiling water reactor illustrated in FIG. 1 without newly loading anew fuel assembly during the fuel exchange after an operation (one cycle operation) is performed for a predetermined period. Next, in FIG. 2, the value of "t" of the fuel assembly loaded into the inside-core region will be described. As an example, a value of "t" of the fuel assembly loaded at the position of the coordinates (9, 10) is obtained as follows.

In FIG. 1, fuel assemblies laterally adjacent to the fuel assembly loaded at the position of the coordinates (9, 10), which is the second cycle fuel assembly are a fifth cycle fuel assembly loaded at the position of the coordinates (8, 10) and a fourth cycle fuel assembly loaded at the position of the coordinates (10, 10). In addition, fuel assemblies longitudinally adjacent to the fuel assembly loaded at the position of the coordinates (9, 10), which is the second cycle fuel assembly are the fourth cycle fuel assembly loaded at the position of coordinates (9, 9) and the fourth cycle fuel assembly loaded at the position of the coordinates (9, 11).

In addition, Also, fuel assemblies diagonally adjacent to the fuel assembly loaded at the position of the coordinates (9, 10) which is the second cycle fuel assembly are the third cycle fuel assembly loaded at the position of the coordinates (8, 9), the second cycle fuel assembly loaded at the position of the coordinates (10, 9), the third cycle fuel assembly loaded at the position of the coordinates (8, 11), and the third cycle fuel assembly loaded at the position of the coordinates (10, 11).

Therefore, $\Sigma Ts$ and $\Sigma Tx$ in the equation (1) described above are respectively $$\Sigma Ts=5(8,10)+4(10,10)+4(9,9)+4(9,11)=17$$

$$\Sigma Tx=3(8,9)+2(10,9)+3(8,11)+3(10,11)=11.$$

$$t=(\Sigma Ts+0.5\times\Sigma Tx)/(4+0.5\times 4)=(17+0.5\times 11)/6=3.75,$$

the value of "t" of the fuel assembly loaded at the position of coordinates (9, 10) illustrated in FIG. 2 is "3.8". The other second cycle fuel assembly (fuel assembly having the shortest loading period) loaded into the inside-core region are similarly obtained and are as illustrated in FIG. 2.

In addition, in FIG. 2, the number of the second cycle fuel assemblies loaded into the inside-core region of the core 12 (¼ core) is 24 and the average value of "t" of the fuel assemblies having the shortest loading period loaded into the inside-core region illustrated in FIG. 2: $\Sigma t/24=3.870=3.9$ and Ta=3.9.

On the other hand, in FIG. 4, the value of "t" of the fuel assembly loaded into the inside-core region will be described. As an example, the value of "t" of the fuel assembly loaded at the position of the coordinates (9, 10) is obtained as follows.

In FIG. 3, fuel assemblies laterally adjacent to the fuel assembly loaded at the position of the coordinates (9, 10) which is the first cycle fuel assembly are the fourth cycle fuel assembly loaded at the position of the coordinates (8, 10) and the third cycle fuel assembly loaded at the position of the coordinates (10, 10). In addition, fuel assemblies longitudinally adjacent to the fuel assembly loaded at the position of the coordinates (9, 10) which is the first cycle fuel assembly are the third cycle fuel assembly loaded at the position of the coordinates (9, 9) and the third cycle fuel assembly loaded at the position of the coordinates (9, 11).

In addition, fuel assemblies diagonally adjacent to the fuel assembly loaded at the position of the coordinates (9, 10) which is the first cycle fuel assembly are the second cycle fuel assembly loaded at the position of the coordinates (8, 9), the first cycle fuel assembly loaded at the position of the coordinates (10, 9), the second cycle fuel assembly loaded at the position of the coordinates (8, 11), and the second cycle fuel assembly loaded at the position of the coordinates (10, 11).

Therefore, $\Sigma Ts$ and $\Sigma Tx$ in the equation (1) described above are respectively $$\Sigma Ts=4(8,10)+3(10,10)+3(9,9)+3(9,11)=13$$

$$\Sigma Tx=2(8,9)+1(10,9)+2(8,11)+2(10,11)=7.$$

$$t=(\Sigma Ts+0.5\times\Sigma Tx)/(4+0.5\times 4)=(13+0.5\times 7)/6=2.75,$$

the value of "t" of the fuel assembly loaded at the position of coordinates (9, 10) illustrated in FIG. 4 is "2.8". The other first cycle fuel assemblies (fuel assemblies with shortest loading period) loaded into the inside-core region are similarly obtained and are as illustrated in FIG. 4.

In addition, in FIG. 4, the number of the first cycle fuel assembly loaded into the inside-core region of the core 12 (¼ core) is 24 and the average value of "t" of the fuel assemblies having the shortest loading period loaded into the inside-core region illustrated in FIG. 4: $\Sigma t/24=3.025=3.0$, Tb=4.0 (average value "t" illustrated in FIG. 4+1). Here, the reason why the average value of "t"+1 illustrated in FIG. 4 is Tb will be described. The value of "t" of each of the fuel assemblies loaded into the inside-core region illustrated in FIG. 4 is the value of "t" of the fuel assembly loaded into the inside-core region of the core 12 illustrated in FIG. 3, that is, it is the value of "t" illustrated in FIG. 3 before burnup. Therefore, since the number of cycle of each fuel assembly is incremented by one after completion of one cycle operation (one cycle burnup) without fuel exchange in the fuel disposition state illustrated in FIG. 4, the value obtained by adding one to the average value of "t" illustrated in FIG. 4 is the T in a case of not performing the fuel exchange, that is, Tb.

In the present example, since Ta=3.9 (average value of "t" in FIG. 2) and Tb=4.0 (average value of "t" in FIG. 4+1), X=0.98 and thus the value of X meets 0.8 or more and 1.0 or less. In other words, in the present example, the core can be operated while adequate excess reactivity therein without loading of a new fuel assembly by a configuration to change only disposition positions of multiple fuel assemblies to be loaded into the core and to perform fuel exchange without taking out the fuel assembly from the core 12 and loading a new fuel assembly in the core 12 after one cycle operation (after one cycle burnup), from the fuel disposition of the equilibrium core illustrated in FIG. 3.

According to the present example described above, a core of a boiling water reactor that can be operated without loading a new fuel assembly in an operation cycle before the decommissioning can be realized.

In addition, according to the present example, the core can be operated while adequate excess reactivity therein without loading a new fuel assembly in the operation cycle before the decommissioning.

Example 2

FIG. 5 is a cross-sectional view illustrating a core 12 of a boiling water reactor of Example 2 according to another example of the invention, which is a fuel disposition view of a ¼ core and FIG. 6 is a view illustrating t of the inside-core region in the fuel disposition illustrated in FIG. 5. The present example is different from Example 1 in that it is configured that only disposition positions of multiple fuel assemblies to be loaded into the core 12 are changed without taking out the fuel assembly from the core 12 and without loading a new fuel assembly from the outside of the core, in particular, a fuel assembly having a short loading period in the core 12 is loaded into the inside-core region and a fuel assembly having a long loading period in the core 12 is loaded into the outside-core region, after one cycle operation (after one cycle burnup), in the fuel disposition of the core 12 (¼ core) which is the equilibrium core illustrated in FIG. 3 described above. The others are the same as those in Example 1.

In FIG. 5, in the fuel disposition of the core 12 (¼ core) which is the equilibrium core illustrated in FIG. 3 described above, "2" to "6" indicating the second cycle fuel assembly to the sixth cycle fuel assembly are assigned to each fuel assembly since it is the fuel disposition of the core 12 after the fuel exchange is performed by only the disposition positions of multiple fuel assemblies to be loaded into the core 12 being changed without taking out the fuel assembly from the core 12 and without loading a new fuel assembly from the outside of the core after one cycle operation (after one cycle burnup).

The core 12 of the boiling water reactor illustrated in FIG. 3 is changed only the disposition position of the fuel assembly loaded into the core 12 in order to be the fuel disposition of the core 12 of the boiling water reactor illustrated in FIG. 5 without newly loading anew fuel assembly during fuel exchange after an operation (one cycle operation) is performed for a predetermined period. Next, in FIG. 6, the value of "t" of the fuel assembly to be loaded into the inside-core region will be described. As an example, the value of "t" of the fuel assembly loaded at the position of the coordinates (9, 10) is obtained as follows.

In FIG. 5, fuel assemblies laterally adjacent to the fuel assembly loaded at the position of the coordinates (9, 10) which is the second cycle fuel assembly are the fourth cycle fuel assembly loaded at the position of the coordinates (8, 10) and the fourth cycle fuel assembly loaded at the position of the coordinates (10, 10). In addition, fuel assemblies longitudinally adjacent to the fuel assembly loaded at the position of the coordinates (9, 10) which is the second cycle fuel assembly are the fourth cycle fuel assembly loaded at the position of coordinates (9, 9) and the fourth cycle fuel assembly loaded at the position of the coordinates (9, 11).

In addition, fuel assemblies diagonally adjacent to the fuel assembly loaded at the position of the coordinates (9, 10) which is the second cycle fuel assembly are the third cycle fuel assembly loaded at the position of the coordinates (8, 9), the second cycle fuel assembly loaded at the position of the coordinates (10, 9), the third cycle fuel assembly loaded at the position of the coordinates (8, 11), and the third cycle fuel assembly loaded at the position of the coordinates (10, 11).

Therefore, $\Sigma Ts$ and $\Sigma Tx$ in the equation (1) described above are respectively $$\Sigma Ts = 4(8,10) + 4(10,10) + 4(9,9) + 4(9,11) = 16$$

$$\Sigma Tx = 3(8,9) + 2(10,9) + 3(8,11) + 3(10,11) = 11.$$

$$t = (\Sigma Ts + 0.5 \times \Sigma Tx)/(4 + 0.5 \times 4) = (16 + 0.5 \times 11)/6 = 3.58,$$

the value of "t" of the fuel assembly loaded at the position of coordinates (9, 10) illustrated in FIG. 6 is "3.6". The other second cycle fuel assemblies (fuel assemblies having shortest loading period) loaded into the inside-core region are similarly obtained and are as illustrated in FIG. 6.

In addition, in FIG. 6, the number of the second cycle fuel assemblies loaded into the inside-core region of the core 12 (¼ core) is 24 and the average value of "t" of the fuel assemblies having the shortest loading period loaded into the inside-core region illustrated in FIG. 6: $\Sigma t/24 = 3.25 = 3.3$ and Ta=3.3.

On the other hand, in FIG. 4, the value of "t" of the fuel assembly to be loaded into the inside-core region will be described. As an example, the value of "t" of the fuel assembly loaded at the position of the coordinates (9, 10) is obtained as follows.

In FIG. 3, fuel assemblies laterally adjacent to the fuel assembly loaded at the position of the coordinates (9, 10) which is the first cycle fuel assembly are the fourth cycle fuel assembly loaded at the position of the coordinates (8, 10) and the third cycle fuel assembly loaded at the position of the coordinates (10, 10). In addition, fuel assemblies longitudinally adjacent to the fuel assembly loaded at the position of the coordinates (9, 10) which is the first cycle fuel assembly are the third cycle fuel assembly loaded at the position of the coordinates (9, 9) and the third cycle fuel assembly loaded at the position of the coordinates (9, 11).

In addition, fuel assemblies diagonally adjacent to the fuel assembly loaded at the position of the coordinates (9, 10) which is the first cycle fuel assembly are the second cycle fuel assembly loaded at the position of the coordinates (8, 9), the first cycle fuel assembly loaded at the position of the coordinates (10, 9), the second cycle fuel assembly loaded at the position of the coordinates (8, 11), and the second cycle fuel assembly loaded at the position of the coordinates (10, 11).

Therefore, $\Sigma Ts$ and $\Sigma Tx$ in the equation (1) described above are respectively $$\Sigma Ts = 4(8,10) + 3(10,10) + 3(9,9) + 3(9,11) = 13$$

$$\Sigma Tx = 2(8,9) + 1(10,9) + 2(8,11) + 2(10,11) = 7.$$

$$t = (\Sigma Ts + 0.5 \times \Sigma Tx)/(4 + 0.5 \times 4) = (13 + 0.5 \times 7)/6 = 2.75,$$

the value of "t" of the fuel assembly loaded at the position of coordinates (9, 10) illustrated in FIG. 4 is "2.8". The other first cycle fuel assemblies (fuel assemblies with shortest loading period) loaded into the inside-core region are similarly obtained and are as illustrated in FIG. 4.

In addition, in FIG. 4, the number of the first cycle fuel assembly loaded into the inside-core region of the core 12 (¼ core) is 24 and the average value of "t" of the fuel assembly having the shortest loading period loaded into the inside-core region illustrated in FIG. 4: $\Sigma t/24 = 3.025 = 3.0$, Tb=4.0 (average value "t" illustrated in FIG. 4+1).

In the present example, since Ta=3.3 (average value of "t" in FIG. 6) and Tb=4.0 (average value of "t" in FIG. 4+1), X=0.83 and thus the value of X meets 0.8 or more and 0.9 or less. In other words, in the present example, gain effect of excess reactivity larger than that of power coastdown operations can be obtained as illustrated in FIG. 7 and the core can be operated while adequate excess reactivity therein during the longer period than that of Example 1 without loading of a new fuel assembly by changing only the disposition positions of multiple fuel assemblies to be loaded into the core 12 without taking out the fuel assembly from the core 12 and without loading a new fuel assembly from the outside of the core, in particular, by adopting a configuration in which the fuel exchange is performed which loads fuel assemblies having a short loading period in the core 12 in the inside-core region and loads fuel assemblies having a long loading period in the core 12 in the outside-core region, after one cycle operation (after one cycle burnup), from the fuel disposition of the equilibrium core illustrated in FIG. 3.

According to the present example described above, in addition to the effect of Example 1, the core can be operated while ensuring excess reactivity in the core over a longer period.

Example 3

FIG. 9 is a view illustrating a cross section of a core 12 of a boiling water reactor of Example 3 according to another example of the invention, which is a fuel disposition view of a ¼ core and FIG. 10 is a view illustrating t of the inside-core region in the fuel disposition illustrated in FIG. 9. The present example is different from Example 1 in that it is configured that only disposition positions of multiple fuel assemblies to be loaded into the core 12 are changed without taking out the fuel assembly from the core 12 and without loading a new fuel assembly from the outside of the core, in particular, fuel assemblies having a short loading period in the core 12 are loaded into the inside-core region and fuel assemblies having a long loading period in the core 12 are loaded into the outside-core region, and thus a configuration of the present example becomes the fuel disposition illustrated in FIG. 5 of Example 2 after one cycle operation (after one cycle burnup), and thus furthermore, only the disposition positions of multiple fuel assemblies to be loaded into the core 12 are changed without taking out the fuel assembly from the core 12 and loading a new fuel assembly from the outside of the core, in particular, the fuel assemblies having a short loading period in the core 12 are loaded into the inside-core region after another cycle operation (after one cycle burnup), in the fuel disposition of the core 12 (¼ core) which is the equilibrium core illustrated in FIG. 3 described above.

In the present example, in the core 12 of the boiling water reactor 12 illustrated in FIG. 3 described above, during fuel exchange after a predetermined period of operation (one cycle operation), without newly loading a new fuel assembly, in order to be the fuel disposition of the core 12 of the boiling water reactor illustrated in FIG. 5, only the disposition position of the fuel assembly loaded into the core 12 is changed, and then furthermore only the disposition position of the fuel assembly loaded into the core 12 is changed in order to be the fuel disposition of the core 12 of the boiling water reactor illustrated in FIG. 9 without newly loading a new fuel assembly after another cycle operation (after one cycle burnup). Next, in FIG. 10, the value of "t" of the fuel assembly to be loaded into the inside-core region will be described. As an example, the value of "t" of the fuel assembly loaded at the position of the coordinates (9, 10) is obtained as follows.

In FIG. 9, fuel assemblies laterally adjacent to the fuel assembly loaded at the position of the coordinates (9, 10) which is the third cycle fuel assembly are the fourth cycle fuel assembly loaded at the position of the coordinates (8, 10) and the fourth cycle fuel assembly loaded at the position of the coordinates (10, 10). In addition, fuel assemblies longitudinally adjacent to the fuel assembly loaded at the position of the coordinates (9, 10) which is the second cycle fuel assembly are the fourth cycle fuel assembly loaded at the position of coordinates (9, 9) and the fourth cycle fuel assembly loaded at the position of the coordinates (9, 11).

In addition, fuel assemblies diagonally adjacent to the fuel assembly loaded at the position of the coordinates (9, 10) which is the second cycle fuel assembly are the third cycle fuel assembly loaded at the position of the coordinates (8, 9), the third cycle fuel assembly loaded at the position of the coordinates (10, 9), the third cycle fuel assembly loaded at the position of the coordinates (8, 11), and the third cycle fuel assembly loaded at the position of the coordinates (10, 11).

Therefore, $\Sigma Ts$ and $\Sigma Tx$ in the equation (1) described above are respectively $$\Sigma Ts = 4(8,10) + 4(10,10) + 4(9,9) + 4(9,11) = 16$$

$$\Sigma Tx = 3(8,9) + 3(10,9) + 3(8,11) + 3(10,11) = 12.$$

$$t = (\Sigma Ts + 0.5 \times \Sigma Tx)/(4 + 0.5 \times 4) = (16 + 0.5 \times 12)/6 = 3.67,$$

the value of "t" of the fuel assembly loaded at the position of coordinates (9, 10) illustrated in FIG. 10 is "3.7". The other third cycle fuel assemblies (fuel assemblies having shortest loading period) loaded into the inside-core region are similarly obtained and are as illustrated in FIG. 10.

In addition, in FIG. 10, the number of the second cycle fuel assemblies loaded into the inside-core region of the core 12 (¼ core) is 42 and the average value of "t" of the fuel assemblies having the shortest loading period loaded into the inside-core region illustrated in FIG. 10: $\Sigma t/42 = 3.802 = 3.8$ and Ta=3.8.

On the other hand, in FIG. 6, the value of "t" of the fuel assembly loaded into the inside-core region will be described. As an example, the value of "t" of the fuel assembly loaded at the position of the coordinates (9, 10) is obtained as follows.

In FIG. 5, fuel assemblies laterally adjacent to the fuel assembly loaded at the position of the coordinates (9, 10) which is the second cycle fuel assembly are the fourth cycle fuel assembly loaded at the position of the coordinates (8, 10) and the fourth cycle fuel assembly loaded at the position of the coordinates (10, 10). In addition, fuel assemblies longitudinally adjacent to the fuel assemblies loaded at the position of the coordinates (9, 10) which is the second cycle fuel assembly are the fourth cycle fuel assembly loaded at the position of the coordinates (9, 9) and the fourth cycle fuel assembly loaded at the position of the coordinates (9, 11).

In addition, fuel assemblies diagonally adjacent to the fuel assembly loaded at position of the coordinates (9, 10) which is the second cycle fuel assembly are the third cycle fuel assembly loaded at the position of the coordinates (8, 9), the second cycle fuel assembly loaded at the position of the coordinates (10, 9), the third cycle fuel assembly loaded at the position of the coordinates (8, 11), and the third cycle fuel assembly loaded at the position of the coordinates (10, 11).

Therefore, $\Sigma Ts$ and $\Sigma Tx$ in the equation (1) described above are respectively $$\Sigma Ts = 4(8,10) + 4(10,10) + 4(9,9) + 4(9,11) = 16$$

$$\Sigma Tx = 3(8,9) + 2(10,9) + 3(8,11) + 3(10,11) = 11.$$

$$t = (\Sigma Ts + 0.5 \times \Sigma Tx)/(4 + 0.5 \times 4) = (16 + 0.5 \times 11)/6 = 3.58,$$

the value of "t" of the fuel assembly loaded at the position of coordinates (9, 10) illustrated in FIG. 6 is "3.6". The other second cycle fuel assemblies (fuel assemblies with shortest loading period) loaded into the inside-core region are similarly obtained and are as illustrated in FIG. 6.

In addition, in FIG. 6, the number of the second cycle fuel assemblies loaded into the inside-core region of the core 12 (¼ core) is 24 and the average value of "t" of the fuel assemblies having the shortest loading period loaded into the inside-core region illustrated in FIG. 6: $\Sigma t/24 = 3.25 = 3.3$ and Tb=4.3 (average value of "t" illustrated in FIG. 6+1).

In the present example, since Ta=3.8 (average value of "t" in FIG. 10) and Tb=4.3 (average value of "t" in FIG. 6+1), X=0.88 and thus the value of X meets 0.8 or more and 0.9 or less. In other words, in the present example, one cycle operation can be further continued from the core 12 of the boiling water reactor in Example 1 described above by only the dispositions of multiple fuel assemblies being loaded into the core 12 being changed without taking out the fuel assembly from the core 12 and without loading a new fuel assembly from outside the core, in particular, by fuel assemblies having a short loading period in the core 12 being loaded into the inside-core region and a fuel assembly having a long loading period in the core 12 being loaded into the outside-core region, and thus a configuration of the present example becoming the fuel disposition illustrated in FIG. 5 of Example 2 after one cycle operation (after one cycle burnup) and then furthermore only the dispositions of multiple fuel assemblies loaded into the core 12 being changed without taking out the fuel assembly from the core 12 and without loading a new fuel assembly from outside the core, in particular, by a configuration in which a fuel assembly having a short loading period in the core 12 is loaded into the inside-core region after another cycle operation (after one cycle burnup), in the fuel disposition of the core 12 (¼ core) which is an equilibrium core in FIG. 3 described above.

According to the present example described above, in addition to the effect of Example 1, further one cycle operation can be continued and the core can be operated while adequate excess reactivity in the core over a long period.

The invention is not limited to the examples described above but includes various modification examples. For example, the examples described above are described in detail in order to explain the invention easily and are not necessarily limited to those including all the configurations described. In addition, it is possible to replace a portion of the configuration of one example with the configuration of another example and, in addition, the configuration of another example can be added to the configuration of one example.

REFERENCE SIGNS LIST

10 boiling water reactor
11 reactor pressure vessel
12 core
13 core plate
14 upper portion lattice plate
15 fuel support
16 core shroud
17 down comer
18 gas-water separator
19 steam dryer
20 shroud head
21 jet pump
22 control rod guide tube
23 control rod drive
24 lower mirror
25 main steam tube
26 water supply tube
27 recirculation system tube
28 recirculation pump
29 lower plenum

The invention claimed is:

1. A core of a boiling water reactor comprising:
multiple fuel assemblies arranged in a square lattice shape in the core,
wherein an arrangement of fuel assemblies adjacent to a fuel assembly having a shortest loading period among the multiple fuel assemblies arranged in the core is arranged in the core so as to satisfy a relationship $X=Ta/Tb$, where X is a parameter representing a core residence period of the arrangement of fuel assemblies that is 0.8 or more and 1.0 or less, where,
Ta: T in a case where fuel exchange is performed,
Tb: T in a case where fuel exchange is not performed,
T: an average value of t of a fuel assembly arranged in an inside-core region of the core having the shortest loading period,
t: $(\Sigma Ts+0.5\times\Sigma Tx)/(4+0.5\times 4)$,
Ts: a number of residence cycles, in the core, of fuel assemblies laterally and longitudinally adjacent to the fuel assembly having the shortest loading period in core cross section, and
Tx: a number of residence cycles, in the core, of fuel assemblies diagonally adjacent to fuel assembly having the shortest loading period in core cross section.

2. The core of a boiling water reactor according to claim 1,
wherein the parameter X is 0.8 or more and 0.9 or less.

3. The core of the boiling water reactor according to claim 1,
wherein the core is configured by the inside-core region and an outside-core region.

4. The core of the boiling water reactor according to claim 1,
wherein, in the core cross section, an inside of a circle having a radius of 70% of a radius of a circumscribed circle circumscribing the fuel assemblies arranged in an outermost periphery of the core is the inside-core region.

5. The core of the boiling water reactor according to claim 2,
wherein, in the core cross section, an inside of a circle having a radius of 70% of a radius of a circumscribed circle circumscribing the fuel assemblies arranged in an outermost periphery of the core is the inside-core region.

6. The core of the boiling water reactor according to claim 3,
wherein, in the core cross section, an inside of a circle having a radius of 70% of a radius of a circumscribed circle circumscribing the fuel assemblies arranged in an outermost periphery of the core is the inside-core region.

* * * * *